UNITED STATES PATENT OFFICE.

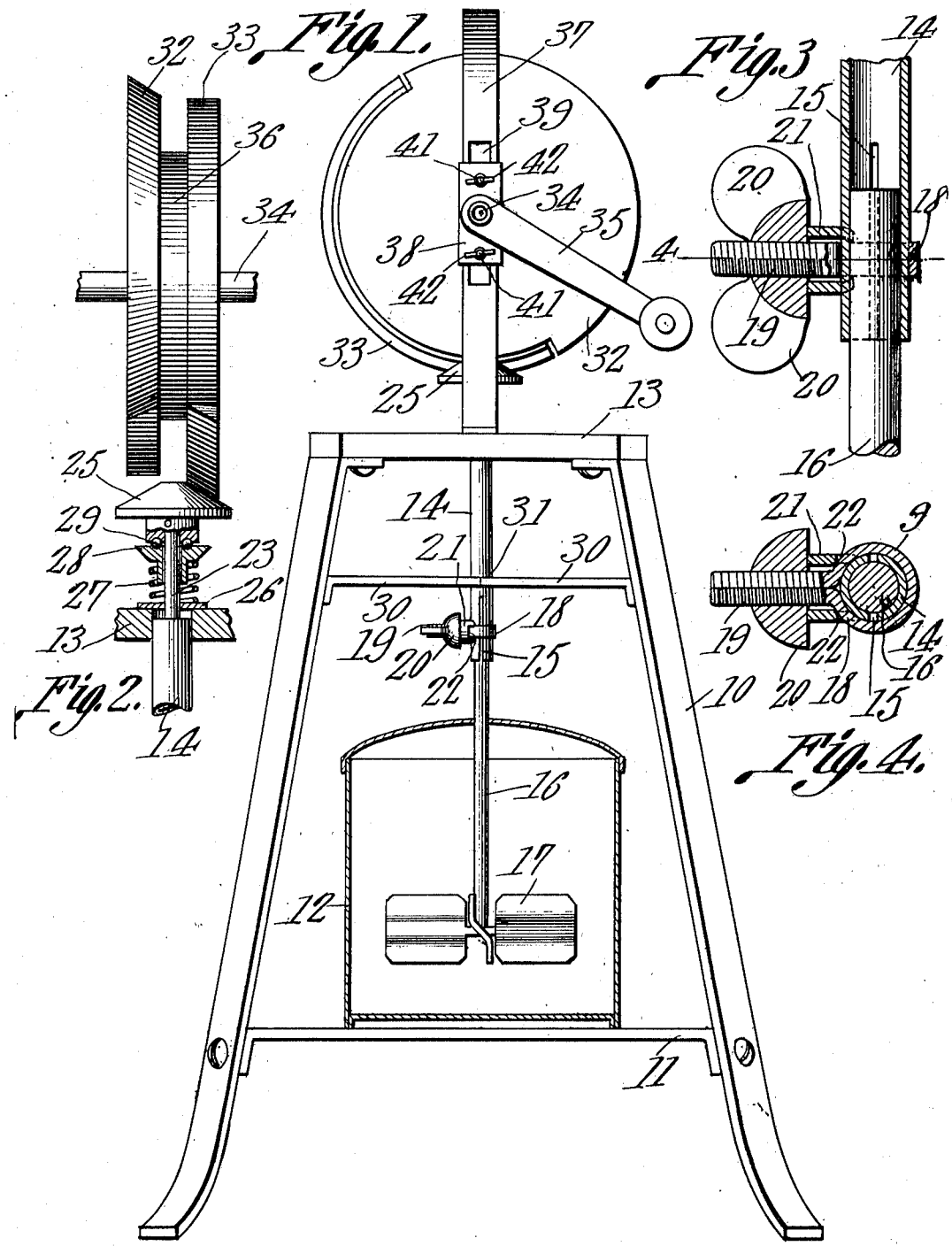

JOHN TILDEN ANTHONY, OF FULTON, MISSISSIPPI.

CHURN.

970,676.   Specification of Letters Patent.   Patented Sept. 20, 1910.

Application filed July 2, 1910. Serial No. 570,128.

*To all whom it may concern:*

Be it known that I, JOHN T. ANTHONY, a citizen of the United States, residing at Fulton, in the county of Itawamba and State of Mississippi, have invented a new and useful Churn, of which the following is a specification.

This invention relates to that class of churns in which the dasher has an alternating rotary movement, and it is the object of the invention to provide improved means for imparting such a movement to the dasher.

The invention also has for its object to provide an improved connection between the drive shaft and the dasher stem, so that the latter will be securely fastened to the drive shaft, and, at the same time, may be readily removed therefrom.

The invention is illustrated in the accompanying drawing in which—

Figure 1 is an elevation of the churn, parts being shown in section. Fig. 2 is an elevation of the drive gear, partly in section. Fig. 3 is a sectional detail of the clamp which secures the dasher stem to the drive shaft. Fig. 4 is a horizontal section on the line 4—4 of Fig. 4.

In the drawing, 10 denotes a suitable stand which supports the churn mechanism. Near the bottom of the stand is a platform 11 on which the cream receptacle 12 is supported. The top of the stand supports a platform 13 having a central opening through which passes the drive shaft 14 of the dasher, said shaft being arranged vertically. The lower end of the drive shaft 14 is split longitudinally as indicated at 15, and is also made tubular so as to receive the upper end of the dasher stem 16. The dasher 17 is carried by the lower end of the stem 16, and operates in the receptacle 12, the stem extending into the receptacle through an opening in the lid or movable top thereof. The dasher stem is clamped to the shaft 14 by means of a sleeve 18 encircling the split portion of the shaft, the ends of the sleeve being formed with outwardly extending stems which are shaped to form, when brought together, a screw stem 19, on which stem is adapted to be screwed a wing nut 20. The stem, between the wing nut and the sleeve, carries a sleeve 21. The inner end of the sleeve 21 is shaped to engage the shaft 14 above and below the sleeve 18, the corresponding edge of said sleeve 21 being made concave so as to closely hug the shaft 14. The sleeve 21 is recessed on opposite sides, as indicated at 22, to clear the sleeve 18, and engage the shaft 14 above and below said sleeve 18 as stated.

It will be evident from the foregoing that when the wing nut 20 is screwed inwardly on the stem 19, the split portion of the shaft 14 will be drawn together, to tightly clamp the dasher stem 16, and the latter may be readily removed upon loosening the wing nut. The dasher stem can also be lengthened or shortened by adjusting the same in the shaft 14.

The upper end of the shaft 14 has a reduced portion 23, to the upper end of which is fixed a friction wheel 25, having a beveled periphery. On the reduced upper end of the shaft 14, is mounted a washer 26 which engages the top of the platform 13. This washer is engaged by one end of a spring 27 which is coiled around the reduced portion 23 of the shaft, the other end of said spring engaging a collar 28 which is loosely mounted on said reduced portion of the shaft. Between the collar 28 and the hub of the friction wheel 25 are interposed antifriction balls 29.

A short distance below the platform 13, the stand 10 carries cross arms 30 having an opening through which the shaft 14 passes.

Operating in conjunction with the friction wheel 25 are two friction disks 32 and 33, respectively, mounted on a shaft 34 which is fitted with a crank handle 35. The disks are carried by a hub 36 in order that they may rotate together, the hub being made fast to the shaft 34 in any suitable manner. The said disks are located on opposite sides of the axis of the friction wheel 25, they being arranged to alternately engage the same, and thus impart an alternating rotary movement to the shaft 14. In order that the friction disks may engage the friction wheel as stated, each disk has a portion of reduced diameter, so that the periphery of this portion of the disk will miss the friction wheel. The periphery of the remaining portion of the disk is beveled to conform to the bevel of the friction wheel, and with which it is adapted to come into contact. The reduced portions of the disks are opposite to those portions of the disks which come in contact with the friction wheel, in view of which it will be evident that one of the friction wheels upon coming into contact with the disk, imparts rotary movement to the shaft 14 in one direction, and when it clears the same, the other friction disk engages the friction wheel, and imparts a rotary movement to the shaft in the opposite direction. The friction wheel is held yieldingly in engagement with the beveled peripheries of the friction disks by the spring 27.

From the platform 13 rise standards 37 carrying bearings 38 in which the shaft 34 is supported. The standards are connected at their upper ends. The bearings 38 are adjustably mounted on the standards 37, so that the friction disks may be properly set with respect to the friction wheel. The standards have slots 39 which extend vertically, and through which slots the shaft 34 passes. Bolts 41 passing through the bearings and through the slots serve to hold the bearings in adjusted position, the bolts being secured by wing nuts 42.

What is claimed is:

1. The combination with a tubular shaft having a longitudinally split end, and a stem extending into the split portion of the shaft, of a split sleeve encircling the split portion of the shaft, and having its ends extended to form a screw stem, a nut screwed on said stem, and a sleeve around the stem between the nut and the first mentioned sleeve, the second mentioned sleeve being shaped to engage the shaft above and below the first mentioned sleeve.

2. The combination with a tubular shaft, having a longitudinally split end, and a stem extending into said end, of a split sleeve encircling the split end of the shaft, and having its ends shaped to form a screw stem, a nut screwed on said stem, and a sleeve around the stem between the nut and the first mentioned sleeve, the inner end of the sleeve being recessed on opposite sides to clear the first mentioned sleeve, and said second mentioned sleeve extending into engagement with the shaft above and below the first mentioned sleeve.

In testimony that I claim the foregoing as my own, I have hereto affixed my signature in the presence of two witnesses.

JOHN TILDEN ANTHONY.

Witnesses:
M. C. BENSON,
G. W. SPENCER.